(12) United States Patent
Bouillon et al.

(10) Patent No.: US 12,518,632 B2
(45) Date of Patent: Jan. 6, 2026

(54) METHOD FOR ADJUSTING THE SPEED OF VEHICLES MOVING IN A CONVOY

(71) Applicant: ORANGE, Issy-les-Moulineaux (FR)

(72) Inventors: Marc Bouillon, Chatillon (FR); Nicolas Bihannic, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 105 days.

(21) Appl. No.: 16/978,019

(22) PCT Filed: Feb. 28, 2019

(86) PCT No.: PCT/FR2019/050464
§ 371 (c)(1),
(2) Date: Sep. 3, 2020

(87) PCT Pub. No.: WO2019/170986
PCT Pub. Date: Sep. 12, 2019

(65) Prior Publication Data
US 2020/0410868 A1    Dec. 31, 2020

(30) Foreign Application Priority Data

Mar. 8, 2018 (FR) ...................... 1852013

(51) Int. Cl.
*G08G 1/00* (2006.01)
*B60W 10/18* (2012.01)
(Continued)

(52) U.S. Cl.
CPC .............. *G08G 1/22* (2013.01); *B60W 10/18* (2013.01); *B60W 30/143* (2013.01);
(Continued)

(58) Field of Classification Search
CPC .... H04L 67/12; G05D 1/0287; G05D 1/0291; G05D 1/0293; G05D 1/0295;
(Continued)

(56) References Cited

U.S. PATENT DOCUMENTS 11,188,074 B1 * 11/2021 Benavidez ........... G05D 1/0022
11,363,670 B2 *  6/2022 Jornod .................... H04W 4/40
(Continued)

FOREIGN PATENT DOCUMENTS

WO       2016134770 A1    9/2016
WO       2017036510 A1    3/2017
(Continued)

OTHER PUBLICATIONS

International Search Report dated Jul. 2, 2019 for corresponding international application No. PCT/FR2019/050464, filed Feb. 28, 2019.
(Continued)

*Primary Examiner* — Fadey S. Jabr
*Assistant Examiner* — Mario C Gonzalez
(74) *Attorney, Agent, or Firm* — David D. Brush; Westman, Champlin & Koehler, P.A.

(57) ABSTRACT

A method for adjusting the speed of at least one vehicle belonging to a set of at least two autonomous vehicles moving on an itinerary in a coordinated manner. Following the acquisition of event information relating to an event occurring on the itinerary, a management entity of a telecommunications infrastructure identifies at least one target vehicle based on the acquired event information and determines a control instruction for the at least one target vehicle based on the acquired event information. The entity then transmits the control instruction to the at least one vehicle.

16 Claims, 5 Drawing Sheets

Figure 1:
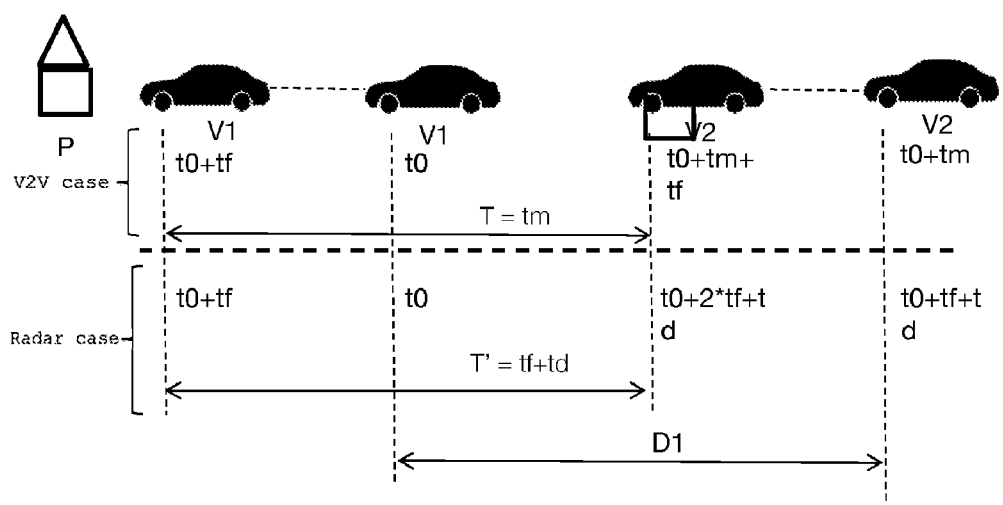

(51) Int. Cl.
*B60W 10/20* (2006.01)
*B60W 30/14* (2006.01)
*B60W 60/00* (2020.01)
*G05D 1/00* (2024.01)
*G08G 1/16* (2006.01)
*H04W 4/46* (2018.01)

(52) U.S. Cl.
CPC ......... *B60W 60/001* (2020.02); *G05D 1/0293* (2013.01); *G05D 1/0297* (2013.01); *G08G 1/162* (2013.01); *H04W 4/46* (2018.02); *B60W 10/20* (2013.01); *B60W 2510/18* (2013.01); *B60W 2556/65* (2020.02)

(58) Field of Classification Search
CPC ...... G05D 1/0297; H04W 4/44; H04W 76/11; G08G 1/0112; G08G 1/0116; G08G 1/0141; G08G 1/096725; G08G 1/162; G08G 1/22
See application file for complete search history.

(56) References Cited

U.S. PATENT DOCUMENTS

| | | | | |
|---|---|---|---|---|
| 11,657,718 | B2* | 5/2023 | Zhao | G08G 1/22 701/117 |
| 2010/0033347 | A1* | 2/2010 | Hayashi | G08G 1/096783 340/905 |
| 2016/0054735 | A1 | 2/2016 | Switkes et al. | |
| 2018/0053410 | A1* | 2/2018 | Li | G08G 1/017 |
| 2018/0224846 | A1* | 8/2018 | Kovacs | G08G 1/096783 |
| 2018/0240339 | A1* | 8/2018 | Moisio | H04W 12/10 |
| 2018/0374366 | A1* | 12/2018 | Reimann | B60T 7/22 |
| 2018/0375939 | A1* | 12/2018 | Magalhães de Matos | H04L 41/12 |
| 2019/0025857 | A1* | 1/2019 | Luckevich | G01C 22/00 |
| 2019/0035269 | A1* | 1/2019 | Donovan | B60W 30/09 |
| 2019/0141603 | A1* | 5/2019 | Vulgarakis Feljan | H04W 8/26 |
| 2019/0232962 | A1* | 8/2019 | Broll | G08G 1/162 |
| 2019/0256088 | A1* | 8/2019 | Sharma | B60W 30/0953 |
| 2020/0300649 | A1* | 9/2020 | Kim | G08G 1/0968 |
| 2020/0341491 | A1* | 10/2020 | Kamini | G08G 1/207 |
| 2021/0084460 | A1* | 3/2021 | Yang | H04W 4/40 |
| 2021/0168564 | A1* | 6/2021 | Liu | H04W 76/11 |
| 2022/0097698 | A1* | 3/2022 | Wang | G08G 1/22 |

FOREIGN PATENT DOCUMENTS

| | | |
|---|---|---|
| WO | 2017148531 A1 | 9/2017 |
| WO | 2017198302 A1 | 11/2017 |

OTHER PUBLICATIONS

Written Opinion of the International Searching Authority dated Jul. 2, 2019 for corresponding international application No. PCT/FR2019/050464, filed Feb. 28, 2019.

English translation of the Written Opinion of the International Searching Authority dated Jul. 16, 2019 for corresponding International Application No. PCT/FR2019/050464, filed Feb. 28, 2019.

"Intelligent Transport Systems (ITS); Vehicular Communications; Basic Set of Applications; Part 2: Specification of Cooperative Awareness Basic Service", European Telecommunications Systems Interconnection (ETSI), ETSI EN 302 637-2 (V1.3.2—Nov. 2014).

"Intelligent Transport Systems (ITS); Vehicular Communications; Basic Set of Applications; Part 3: Specifications of Decentralized Environmental Notification Basic Service", European Telecommunications Systems Interconnection (ETSI), ETSI EN 302 637-3 (V1.2.2—Nov. 2014).

Mahlisch et al., "Heterogeneous Fusion of Video, LIDAR and ESP Data for Automotive ACC Vehicle Tracking", IEEE, International Conference on Multisensor Fusion and Integration for Intelligent Systems, Sep. 2006.

Rasshofer et al., "Automotive Radar and Lidar Systems for Next Generation Driver, Assistance Functions", Advances in Radio Science, 3, 205-209, 2005, May 12, 2005.

* cited by examiner

METHOD FOR ADJUSTING THE SPEED OF VEHICLES MOVING IN A CONVOY

CROSS-REFERENCE TO RELATED APPLICATIONS

This Application is a Section 371 National Stage Application of International Application No. PCT/FR2019/050464, filed Feb. 28, 2019, which is incorporated by reference in its entirety and published as WO 2019/170986 A1 on Sep. 12, 2019, not in English.

1. FIELD OF THE INVENTION

The invention application lies in the field of communications networks for services to vehicles and more specifically in the techniques implemented for the coordination of vehicles moving in convoys.

2. PRIOR ART

Communications techniques are being increasingly considered in the field of vehicle networks. Thus, driverless vehicles and mechanisms making it possible to improve traffic fluidity and user safety are the subject of communications and studies of communications services suited to this context.

In this context of convergence of communications services with vehicle movements, the formation of vehicle convoys is increasingly considered in the road domain for various reasons, including:
 "overall" energy saving by drag effect
 Traffic fluidity by avoiding the effects of slowdown and acceleration
 Safety in avoiding pile-ups
 Increased traffic flow acceptable per lane
The formation of convoys is considered only inasmuch as the vehicles forming the convoy obtain a certain autonomy with respect to the driver, notably for vehicle braking and acceleration servocontrol. The communication technologies are therefore proving particularly useful for the implementation of convoys, notably to ensure the coordination of the vehicles in a convoy.
The braking efficiency of vehicles being driven autonomously (without driver) proves more efficient than that of vehicles with a driver. That is explained by the additional time compared to an autonomous system for the reaction of the human being and picking up information preceding the braking. This pick-up time is assessed as between 1 and 2 seconds when the situation assessment time by an autonomous vehicle is less than one second. The time for the brakes to take effect is virtually equivalent between an autonomous vehicle and a vehicle driven by a person.

In the context of convoys, emergency braking is of great importance, in order to avoid serial accidents. The systems commonly used, such as radar or lidar systems, to detect the exact moment when a vehicle in front begins its braking process do not meet the need of rapidly managing an emergency situation. Thus, when a vehicle of the convoy begins to brake, the next vehicle in the convoy has to detect the use of the braking system of the vehicle in front and the braking force implemented (a function of the proximity of the danger), for it also to begin its braking phase. The offset time between the start of the braking of the first vehicle and the start of the braking of the next vehicle of the convoy is equal to the brake actuation time to which is added the detection time on the next vehicle. The longer this time is, the higher are the risks of accident and the more the distance between the vehicles of a convoy has to be increased, to the detriment of the number of vehicles that can be inserted in a convoy over a given distance.

The ITS (Intelligent Transport Systems) techniques propose systems for transmitting messages by microwaves between vehicles and can be advantageous for improving the braking of the vehicles following one another in a convoy. The vehicle applying emergency braking in a convoy can thus transmit information of an emergency nature to the vehicle following it. The transmission of a message to the following vehicle is faster than the detection of the braking by the following vehicle. For these message transmission purposes, the ETSI (European Telecommunications Systems Interconnection) organization has specified messages of CAM (Cooperative Awareness Message) type in the document ETSI EN 302 637-2 (V1.3.2-2014-11) and of DENM (Decentralized Environmental Notification Message) type in the document ETSI EN 302 637-3 (V1.2.2-2014-11).

The ITS techniques for vehicle-to-vehicle communications are increasingly often used for communications between 2 vehicles and are also limited to the range of the radio waves between the vehicles. The result thereof is that the braking information of one vehicle can be transmitted to the vehicle which follows it with better efficiency than if the second vehicle had to itself detect the braking of the vehicle preceding it but it cannot be transmitted to all the vehicles of the convoy in parallel. The message can be transmitted from vehicle to vehicle but that introduces a propagation delay that is not compatible with the braking demand. The patent application US 2016/0054735 A1 and the patent application WO 2016134770 A1 propose information propagation solutions for managing the inter-vehicle distance but do not disclose a solution for managing braking or acceleration information for a set of vehicles of a convoy.

One of the aims of the present invention is to remedy the inadequacies/drawbacks of the state of the art discussed above and/or to provide enhancements thereto.

3. SUMMARY OF THE INVENTION

The invention improves the situation using a method for adjusting the speed of at least one vehicle belonging to a set of at least two autonomous vehicles moving on an itinerary in a coordinated manner, comprising the following steps implemented in a management entity of a telecommunications infrastructure capable of transmitting a message to the at least one vehicle:
 acquiring event information relating to an event occurring on said itinerary,
 identifying at least one target vehicle based on the acquired event information,
 determining a control instruction for the at least one target vehicle based on the acquired event information,
 transmitting said control instruction to the at least one vehicle.

The vehicles belonging to a set of autonomous vehicles forming a convoy have to move on an itinerary by taking account of the speed and the brakings or accelerations of the other vehicles. Their progress must therefore be coordinated. The itinerary can be on a road lane or on any other infrastructure used to move along any type of trajectory, straight or curved. The inter-vehicle communications, implemented in the techniques based on the prior art, are limited on the one hand by the fact that a vehicle generally communicates with only some of the vehicles of the convoy, because of the radio range limit or else because the communications protocols are not designed to comprise information transmitted by one vehicle to a defined set of vehicles, such as a convoy.

From event information received, for example from one of the vehicles, the management entity, or server, can advantageously simultaneously inform all the other vehicles of the convoy, improving the information broadcasting speed. The invention also makes it possible to not systematically broadcast the information to all the vehicles but to select only the target vehicles, that is to say those possibly impacted or affected by the event information received, for example based on the vehicle having transmitted the information or else based on the information itself. In a convoy, one or more target vehicles are potentially affected by an event occurring on an itinerary. These vehicles, once determined, will have to implement an action to respond to the event that is occurring. The management entity, based on the information received, must identify the vehicles of the convoy which will be affected by the information and determine the control instruction to be transmitted (braking, acceleration, stop, etc.). By default, it can identify all the vehicles or, for example, only some of the vehicles. The type of event information and the transmitter of the information will be able to influence the vehicles concerned. This method therefore makes it possible to shorten the propagation delay for an even occurring in the passing of a vehicle convoy, or in the vehicle convoy itself, but also improve the information broadcasting range. The management entity of the infrastructure can in fact transmit the message comprising the control instruction to a set of vehicles by using the network of the operator, of wide range, while the direct transmission, without the intervention of the server of the operator, from one vehicle to another is limited in range and therefore reduces the possibility of rapid transmission of the message comprising the control instruction to a set of vehicles. The use of a management entity to inform a set of vehicles also makes it possible to be able to interfere with conditions originating from other servers to complement and refine the control instruction transmitted.

The management entity can be managed by a telecommunications operator or by any other type of operator (road infrastructure, motorway manager, rail, town, etc.).

For example, the knowledge of weather conditions over a given zone can be used to transmit a control instruction better suited to the context of movement of the convoy formed by the set of vehicles. A management entity of another convoy can transmit important information (stoppage, failure, etc.) on its convoy to the management entity in charge of the set. A road infrastructure manager can transmit information on works currently underway or an accident which has occurred on an infrastructure. A police service can inform the management entity on current incidents in a town for example.

According to one aspect of the invention, in the adjustment method, the event information is acquired from a vehicle of the set.

The method can advantageously be implemented when a vehicle, notably the lead vehicle of the set, is for example obliged to brake suddenly and the other vehicles of the set have to adapt their behavior to the behavior of the first vehicle. The transmission of the control instruction transmitted by the server based on the information received from the vehicle having to brake thus makes it possible to avoid accidents and avoid compromising the coordination of the movement of the vehicles.

According to another aspect of the invention, in the adjustment method, the event information acquired relates to the braking of said vehicle of the set.

The method is notably necessary in the event of braking of the vehicle. The information on the braking applied by the vehicle has to be transmitted without haste to all the vehicles following the vehicle having to brake. It is also crucial for the braking of the vehicles following the vehicle to be performed in a coordinated manner, that is to say for each vehicle of the set to brake at the same moment and with the same intensity.

According to another aspect of the invention, in the adjustment method, the event information acquired by the management entity is also received by the vehicle following the vehicle transmitting the event information in the set.

With respect to the speed of propagation of the control instruction to the set of vehicles, the first iteration of transmission of the information from one vehicle to the vehicle which is following it can be more efficient than the transmission of the information via a server. The transmission of the information by the first vehicle to the vehicle following it in parallel to the sending of the information to the server makes it possible to select the better approach for the transmission of the information to the different vehicles. That therefore makes it possible to limit the delay in propagation of the information for each vehicle of the set by choosing the best suited propagation option.

According to another aspect of the invention, in the adjustment method, the event information is acquired from a device deployed on the itinerary.

The interaction between the devices located along the journey and the convoy of vehicles is advantageous for best regulating the traffic and the progress of the convoys. Devices, such as traffic lights and warning light panels can transmit information to the entity to avoid untimely braking, and even accidents.

According to another aspect of the invention, in the adjustment method, the control instruction is a braking setpoint of the at least one target vehicle.

The good coordination of the set of vehicles can be compromised notably in the case where emergency braking has to be applied by the different vehicles of the group. Indeed, in case of delay in the transmission and the recognition of the control instruction, that can lead to snarl-up effects or even serial accidents. The control instruction corresponding to a braking setpoint is therefore essential to the implementation of groups of vehicles forming a convoy.

According to another aspect of the invention, in the adjustment method, the control instruction also comprises braking intensity datum.

The braking setpoint can, according to one alternative, comprise a braking intensity value. A single setpoint, without intensity value, may lead to different braking intensities and therefore to accidents. The braking intensity can also be adjusted according to the type of vehicle. For a given braking setpoint, the intensity value transmitted if a bunch of vehicles comprises at least one heavy vehicle of truck type and the braking intensity transmitted if a bunch of vehicles comprises only light vehicles could be different, depending on the mode of implementation.

According to another aspect of the invention, the adjustment method also comprises the transmission of a notification message comprising the control instruction to a second management entity of a telecommunications infrastructure.

The control instruction is advantageously transmitted to another management entity to coordinate the braking of distinct convoys, for example managed by different entities.

The convoy vehicles of a given geographic zone, having to brake in a coordinated manner, can thus be informed of the braking of different convoys and thus avoid accidents between convoys.

According to another aspect of the invention, the adjustment method also comprises the reception, from the at least one target vehicle, of an acknowledgement message comprising a parameter relating to the updated speed of the at least one target vehicle.

The entity uses the information transmitted by the vehicle to adjust, if necessary, the instructions transmitted to the vehicles of the set. For example, if the vehicle does not adjust its speed in accordance with the control instruction received, for example because of weather conditions (if there is a problem of road grip for example), the entity can then transmit a new control instruction taking account of the acknowledgement message received.

According to another aspect of the invention, in the adjustment method, the control instruction is transmitted to the at least one target vehicle by using a multicast-type transmission mode.

The transmission of the message comprising the control instruction to a set of vehicles of a set can advantageously use the multicast transmission mode. An identifier of the group can advantageously be used to determine the multicast group to which the message must be transmitted. In the case where several groupings are impacted by an event and have to receive a same control instruction, a wider multicast domain, covering a geographic zone for example, can be used.

According to another aspect of the invention, in the adjustment method, the determination of the control instruction relates to a datum acquired from a vehicle of another set.

The coordination between the sets of vehicles is also particularly important. It is necessary in particular to ensure that a sufficient distance is maintained between two sets to avoid serial problems over several sets. In the case of sets managed by one and the same entity, or if an entity ensures the coordination of the sets for a given geographic zone, vehicles of other sets can transmit indications to the entity that the latter can exploit to determine the instruction.

The different aspects of the adjustment method which have just been described can be implemented independently of one another or in combination with one another.

The invention relates also to a device for adjusting the speed of at least one vehicle belonging to a set of at least two autonomous vehicles moving on an itinerary in a coordinated manner, implemented in a management entity of a telecommunications infrastructure, capable of transmitting a message to at least one vehicle, and comprising:
- an acquisition module, capable of acquiring event information relating to an event occurring on said itinerary,
- an identification module, capable of identifying at least one target vehicle based on the acquired event information,
- a module for determining a control instruction for the at least one target vehicle based on the acquired event information,
- a transmitter, capable of transmitting said control instruction to the at least one target vehicle.

This device, capable in all its embodiments of implementing the adjustment method which has just been described, is intended to be implemented in a management entity of a communications network.

The invention relates also to a system for adjusting the speed of at least one vehicle belonging to a set of at least two autonomous vehicles moving on an itinerary in a coordinated manner, implemented in a management entity of a telecommunications infrastructure, and comprising:
- an adjustment device,
- at least one vehicle comprising a receiver of a control instruction.

The invention relates also to a computer program comprising instructions for implementing the steps of the adjustment method which has just been described, when this program is executed by a processor.

This program can use any programming language, and be in the form of source code, object code, or intermediate code between source code and object code, such as in a partially compiled form, or in any other desirable form.

The invention also targets a computer-readable information medium, comprising instructions of the computer program as mentioned above.

The information medium can be any entity or device capable of storing the programs. For example, the medium can comprise a storage means, such as a ROM, for example a CD ROM or a microelectronic circuit ROM, or even a magnetic storage means, for example a hard disk.

Also, the information medium can be a transmissible medium such as an electrical or optical signal, which can be routed via an electrical or optical cable, wirelessly or by other means. The program according to the invention can in particular be downloaded over a network of Internet type.

Alternatively, the information medium can be an integrated circuit in which the program is incorporated, the circuit being adapted to execute or be used in the execution of the method concerned.

4. DESCRIPTION OF THE FIGURES

Figure 2:
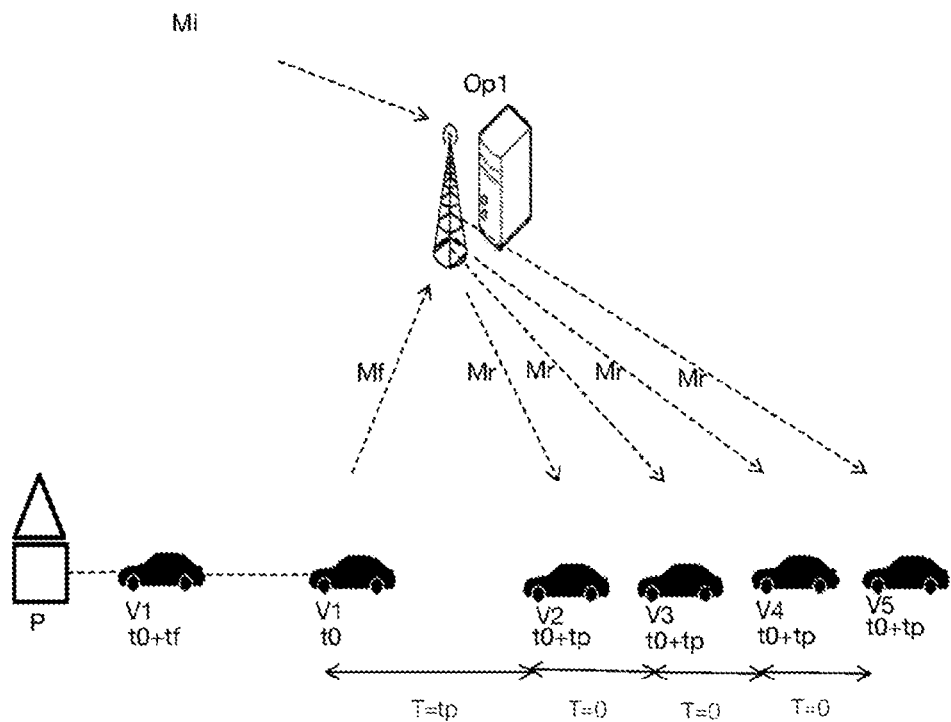
Figure 3:
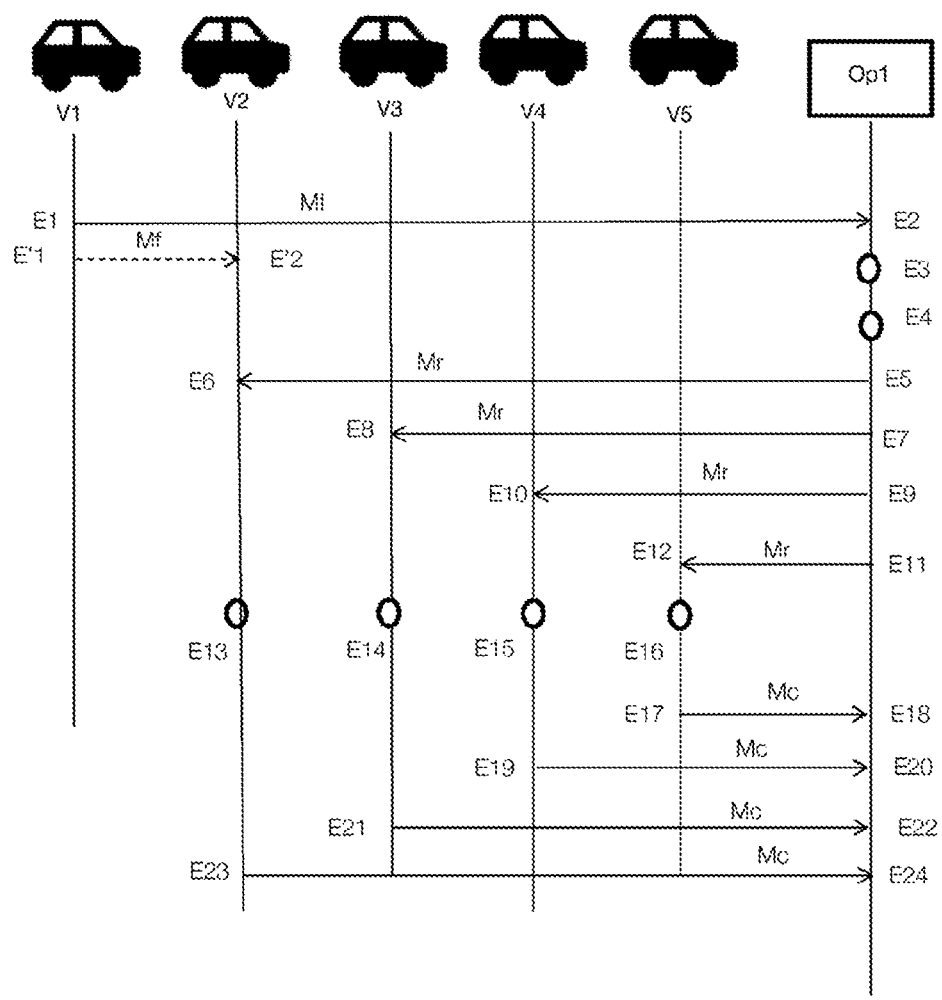
Figure 4:
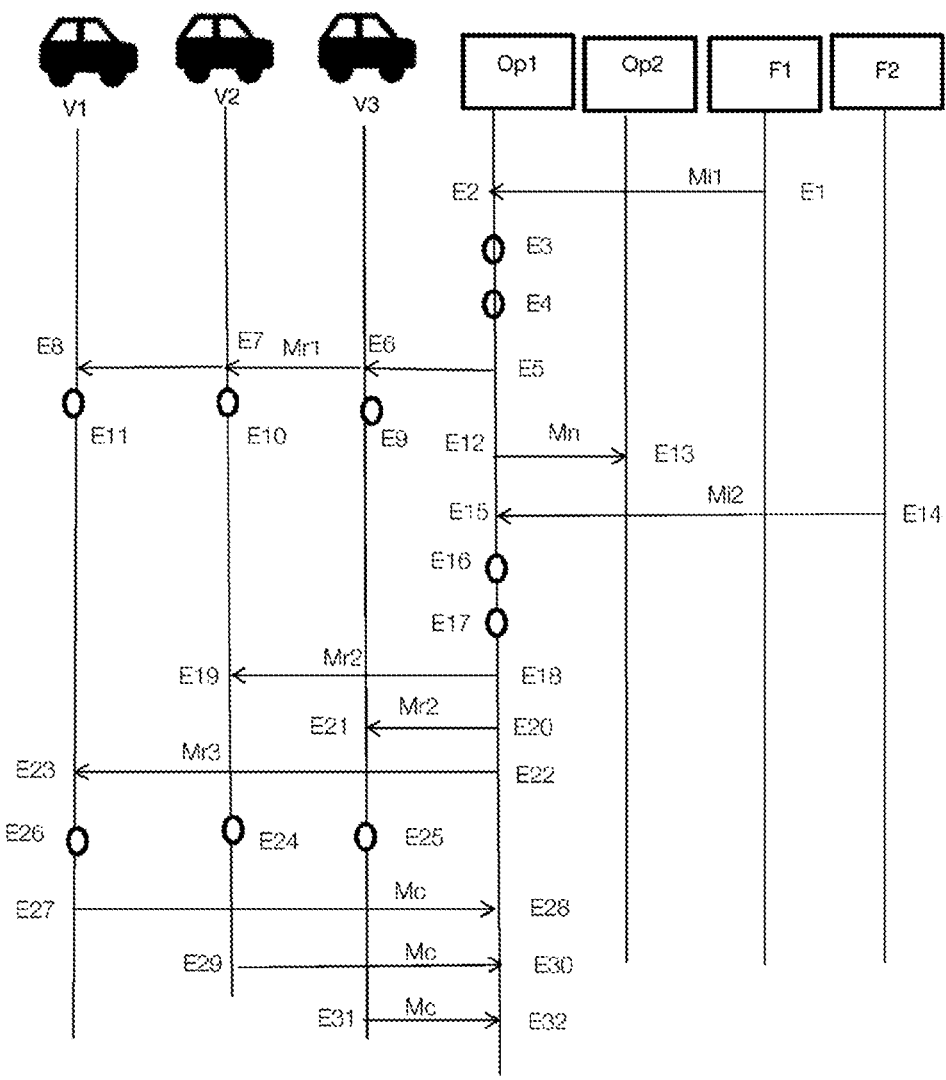
Figure 5:
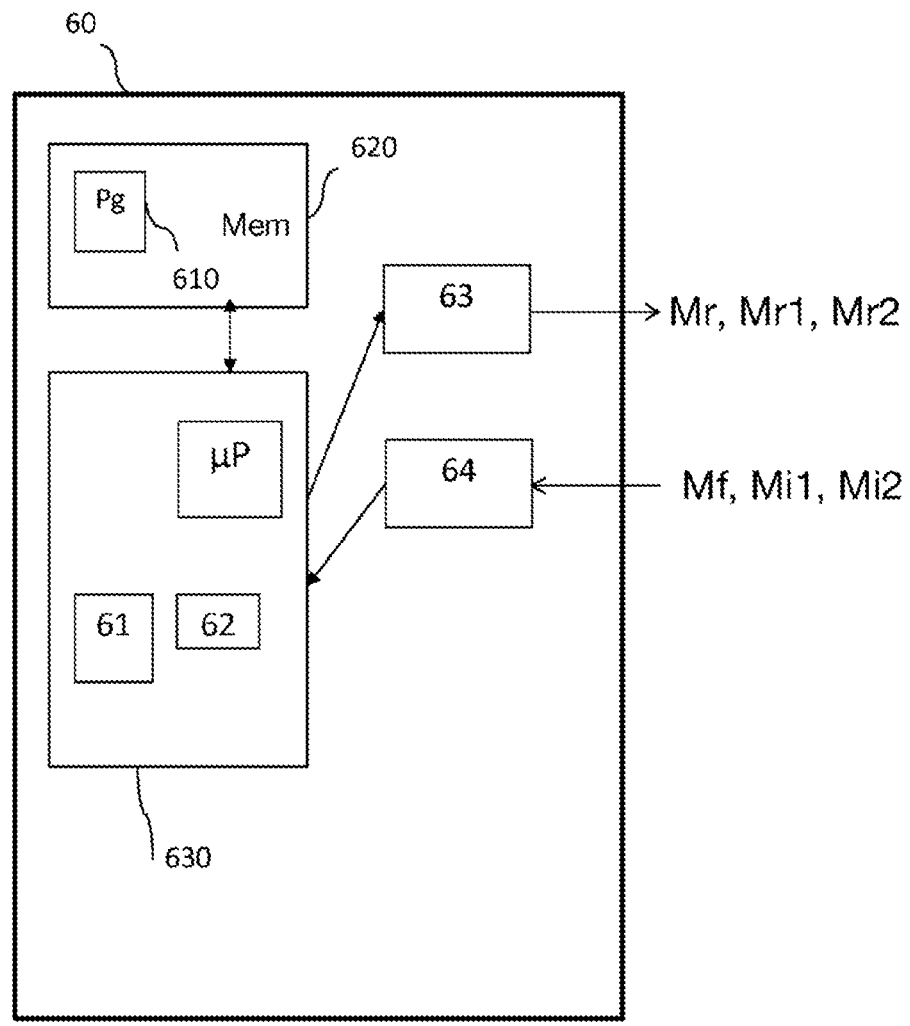

Other advantages and features of the invention will become more clearly apparent on reading the following description of a particular embodiment of the invention, given as an illustrative and nonlimiting example only, and the attached drawings, in which:

FIG. 1 presents a simplified view of the braking of a convoy according to a prior art, FIG. 2 presents a simplified view of the adjustment method according to an aspect of the invention, FIG. 3 presents an overview of the adjustment method according to a first embodiment of the invention, FIG. 4 presents an overview of the adjustment method according to a second embodiment of the invention, FIG. 5 presents an example of structure of an adjustment device according to an aspect of the invention.

5. DETAILED DESCRIPTION OF AT LEAST ONE EMBODIMENT OF THE INVENTION

Hereinafter in the description, examples of several embodiments of the invention are presented in a mobile communication infrastructure of cellular type (3G, 4G, 5G), but the invention can also be implemented in other types of wireless communications infrastructure (Wi-Fi suited to the motor vehicle field in particular: notably 802.11p specifications). In the document, the terms "set" to indicate a set of vehicles or "convoy" will be used interchangeably to designate the vehicles moving in a coordinated manner on one and the same itinerary, that is to say following one and the same path and one and the same trajectory. The different vehicles of the set or convoy therefore have equivalent speeds to ensure the coordinated movement of the vehicles.

Reference should first of all be made to FIG. 1 which presents a simplified view of the braking of a convoy according to a prior art technique. In this FIG. 1 it is considered that the vehicles V1 and V2 are traveling in a convoy, that is to say that each vehicle is traveling at the same speed or at a very similar speed, on one and the same lane and in the same direction. Two vehicles are represented in FIG. 1 but the convoy can comprise a greater number of vehicles. The vehicles can be motorcycles, cars or trucks and it is considered that the vehicles have a certain autonomy, that is to say the braking, acceleration, steering controls are handled automatically, without the intervention of a driver.

In this example, the situation is assumed in which the vehicle V1 must undertake emergency braking for example to avoid collision with the obstacle P on the lane. At the instant t0, the vehicle V1 begins to actuate its brakes and begins to decelerate at t0+tf, tf representing the time during which the vehicle is not yet decelerating.

Whatever the system used—radar, lidar, or sending of a direct message between vehicles from one vehicle to another—there is a latency resulting in a time offset between the starts of deceleration (respectively acceleration) of the two vehicles.

The two vehicles V1 and V2 are spaced apart by a distance D1 at t0 which corresponds to the safety distance.

In the case of use of an alert message conveyed by radio wave, that is to say from vehicle to vehicle (V2V case in FIG. 1), the vehicle V1 may not be autonomous but it nevertheless directly transmits braking information to the vehicle V2 which must brake in reaction to the braking of the vehicle V1. The vehicle V1 transmits the start-of-braking information to the vehicle V2 before its actual deceleration phase. An offset nevertheless occurs between the start of braking of the two vehicles. This offset is equal to a value T=tm in which tm represents the latency time of the message sending/reception system.

These days, systems of radar or lidar type are used to ensure the detection by the vehicle V2 of the braking of the vehicle V1. Information on the radar or lidar systems can be obtained from the following documents (Heterogeneous Fusion of Video, LIDAR and ESP Data for Automotive ACC Vehicle Tracking, IEEE, International Conference on Multisensor Fusion and Integration for Intelligent Systems, 26 Dec. 2006 and Advances in Radio Science, Automotive Radar and Lidar Systems for Next Generation Driver, Assistance Functions, 12 May 2005).

According to the radar case in FIG. 1, the vehicle V1 applies its braking system and the vehicle V2 detects that the vehicle V1 is braking when the deceleration of the vehicle V1 takes effect, and only then does the vehicle V2 in turn actuate its braking system. An offset therefore occurs between the start of braking of the two vehicles as in the preceding example. This offset is equal to a value T'=tf+td in which td represents the latency time of the lidar/radar detection system and tf representing the time during which the vehicle is not yet decelerating after having actuated its brakes.

In both cases, the two vehicles V1 and V2 should be apart by a distance D1 that is at least equal to the relative distance covered by the vehicle V2 catching up the vehicle V1 during the time T or T', depending on the example chosen (V2V or radar).

It is also possible for the speed differential between the two vehicles V1 and V2 to remain until the vehicle V1 is completely stopped. That can be the case in an emergency braking in the case where the braking capacities of the vehicle V1 are greater than that of V2. The vehicle V2 must also determine the value of the deceleration of the vehicle V1 to be able itself to adjust its deceleration to that of the vehicle preceding it. The distance between vehicles in the convoy must be great enough to avoid collisions in an emergency braking situation. The techniques based on ITS (Intelligent Transport Systems) and notably the so-called V2V (Vehicle-to-Vehicle) communications appear suited to the case of use of the braking of two vehicles. Messages of CAM (Cooperative Awareness Message) type specified in the document ETSI EN 302 637-2 (V1.3.2-2014-11) (Intelligent Transport Systems (ITS); Vehicular Communications; Basic Set of Applications; Part 2: Specification of Cooperative Awareness Basic Service) or DEMN (Decentralized Environmental Notification Message) type specified in the document ETSI EN 302 637-3 (V1.2.2-2014-11) (Intelligent Transport Systems (ITS); Vehicular Communications; Basic Set of Applications; Part 3: Specifications of Decentralized Environmental Notification Basic Service) exchanged over a wireless infrastructure directly from vehicle to vehicle, for example by radio waves, can be used to transmit the braking information with possible extensions.

If it is considered that the time tm corresponds to the time to receive and process a braking message by the vehicle V2, then tm must be less than tf+td for this type of solution to be of interest.

While it is possible to envisage tm<tf+td for two vehicles, it is probable that, for a convoy comprising more than two vehicles, which is the objective of convoy organization, this type of V2V solution will not be an optimal solution. Indeed, the vehicle V2, once it has received and processed the braking message originating from the vehicle V1, must transmit it to the next vehicle or transmit a new message informing of its own braking, with a new latency time.

The following vehicle may then have to brake more powerfully than the preceding vehicle to compensate for the latency time. This is particularly the case for an emergency braking, for example if the distance D is less than a certain threshold that can a priori be determined. For a vehicle of the convoy, it will then be impossible to brake as intensely as necessary and an accident will occur. For a normal braking, the point is less critical if there can be early awareness with respect to the obstacle. The V2V techniques, used from vehicle to vehicle, are therefore not optimal, even unsuitable, for vehicle convoy braking. Since the message from the vehicle V1 is transmitted step-by-step, latency times are added in line with the transmission to the vehicles of the convoy and the range limit of the V2V communications do not allow the vehicle V1 to transmit its braking information simultaneously to all the vehicles of the convoy.

With respect to FIG. 2, an adjustment method according to an aspect of the invention is presented.

The convoy of vehicles is composed of five vehicles V1, V2, V3, V4 and V5. As in FIG. 1, the vehicle V1 must brake intensively because of an obstacle P on its lane. The time representing the period during which the vehicle V1 is not yet decelerating after having actuated its brakes does not vary with respect to FIG. 1 and represents a time tf. Unlike FIG. 1, according to one example, the vehicle V1 does not transmit a message relating to its braking to the vehicle which follows it, namely the vehicle V2. According to another example, the vehicle V1 can transmit a message relating to its braking to the vehicle which follows it.

The vehicle V1 transmits event information, corresponding to a braking message Mf, to a management entity of an operator network, or service platform. The vehicle can reach the management entity because the address has been communicated to it upon its subscription to the convoy management service, or else because the address of the entity is specific to the vehicle or even because it was communicated to it when it joined the convoy of vehicles. On receipt of the message Mf, the management entity determines the convoy to which the vehicle V1 belongs, for example from an identifier transmitted by the vehicle V1 or by an identification of the subscription to which the vehicle V1 has subscribed via its owner, and identifies the target vehicles belonging to the convoy and that have to be informed of the intensive braking of the vehicle V1. The message Mf can comprise information on the intensity of the braking of the vehicle V1. Based on the event information and the parameters present in the message Mf, the management entity transmits a braking recommendation message Mr, possibly with a braking intensity value, to all the vehicles possibly impacted, or target vehicles, and therefore vehicles following the vehicle V1 in the convoy. The message Mr can be transmitted in unicast mode, with one message for each recipient vehicle, in multicast mode by associating a multicast address with the convoy, or by using a broadcast address for all the vehicles V2, V3, V4, V5 of the convoy. It is also possible to send, practically in parallel, several messages by exploiting the possibility of multiplexing at the radio access level. The simultaneous (or quasi-simultaneous) sending of the message Mr to the target vehicles V2, V3, V4, V5 thus makes it possible to coordinate the braking of the vehicles of the convoy. The transmission time of the braking message Mf from the vehicle V1 to the management entity added to the transmission time of the message Mr from the management entity to the vehicles V2, V3, V4, V5 represents a time tp. The time tp, according to the communication protocols and the network architectures used, will be able to be greater than the time tm of FIG. 1 (offset time between the first vehicle V1 and the second vehicle V2) for the vehicle 2, but for all the other vehicles of the convoy, the time tp, identical for all the vehicles, is less than the offset time that can be estimated at n*tm for the vehicles Vn with n greater than 2 (time tm of the message transmitted step-by-step from the vehicle V1 to the vehicle V2, then from V2 to V3, then from V3 to V4, etc.). Depending on the adjustment method implemented, it is possible to envisage organizing convoys with distances between the vehicles V2, V3, V4 that are reduced (theoretically zero) since each vehicle is synchronously warned of the braking information and can therefore brake at the same time as the vehicles preceding it. Only the vehicle V2 has to be sufficiently far away from the vehicle V1 to take account of the transmission time tp. Furthermore, the recourse to the management entity makes it possible to be able to inform the vehicles even though the vehicles have not detected problems, notably if a problem has not been detected by a vehicle of the convoy but by another device. For example, the management entity, in conjunction with weather forecasting systems or else with highway infrastructure management systems, even with management entities of other convoys, can acquire information messages Mi from other entities or devices positioned on the itinerary of the convoy, for example and transmit a control instruction to the target vehicles V1, V2, V3, V4, V5 of the convoy. The latter will thus be able to anticipate any problems that can occur on the highway and thus avoid emergency brakings. The recourse to an operator network therefore makes it possible to ensure the reliability and the availability of the service, the coordination of the braking actions between the vehicles of a convoy and the interfacing with other actors and service providers.

It should be noted that the examples given in FIGS. 1 and 2 relate to braking cases but the architectures implemented are also valid for acceleration phases; the difference being that the criticality of the actions and the necessary coordination is less crucial for an acceleration phase.

Reference is now made to FIG. 3 which presents an overview of the adjustment method according to a first embodiment of the invention.

In this embodiment, it is considered that 5 vehicles V1, V2, V3, V4, V5 form part of a convoy and the first vehicle of the convoy is the vehicle V1. The formation and the management of the convoy are not developed in this embodiment. It is considered that the entity Op1 managing the convoy knows the vehicles V1 to V5 and knows the order in which they are in the convoy.

In the step E1, the vehicle V1 transmits to the entity Op1 a message Mf thus indicating to the entity Op1 that it is performing a braking maneuver. According to one alternative, the message Mf also comprises a braking intensity value. The message Mf, according to another alternative, can comprise an emergency indicator in the case for example where it is an emergency braking and/or the braking intensity is very great. On receipt of the message Mf in the step E2, the entity Op1 determines the origin of the message Mf. The entity Op1 can for example use the network address used by the vehicle V1 to transmit the message Mf or else another identifier, such as a vehicle identifier or a vehicle address associated with a convoy identifier, attesting to the identity of the transmitter of the message Mf. It should be specified that the different exchanges between the vehicles and the entity Op1 can advantageously be secured, by authentication and encryption mechanisms for example based on the IPSEC (Internet Protocol Security) protocols. In the step E3, the entity Op1 then determines the vehicles possibly impacted, or target vehicles, from the information contained in the message Mf. For that, it can for example use a database containing the different convoys managed, the vehicles belonging to each convoy and their place in the respective convoys. It can also use a mapping, or even photos transmitted by cameras on the route. As an example, the management entity uses a database for each convoy listing the different vehicles and their place in the convoy, and possibly their respective speeds. From the message Mf received and the table for each convoy, and notably from the address of the vehicle V1 or the identifier of the vehicle V1, it can identify the target vehicles to which to send a control instruction. When braking information is involved, the vehicles of the convoy following the vehicle V1 must be slowed down.

In the step E4, it determines what action must be communicated to the determined vehicles. According to one alternative, it determines a value of intensity of the action to be communicated. This determination is made on the basis of the event information Mf acquired. It can also use other information such as the entity sending the event information Mf to determine the control instruction, in the present case the braking setpoint. It therefore determines that a braking action with an intensity value must be transmitted to the target vehicles V2, V3, V4, V5. The messages Mr transmitted by the entity Op1 are transmitted by using a unicast mode in the example of FIG. 3 but they could be transmitted in multicast or broadcast mode without preference. The unicast mode makes it possible to select the vehicles individually to which the information is sent. The multicast mode makes it possible to uniquely inform a set of vehicles identified by the multicast address. The broadcast mode makes it possible to inform all the vehicles without preference for example to communicate general information to all the vehicles.

The messages Mr are transmitted in the respective steps E5, E7, E9, E11 and received by the vehicles V2, V3, V4, V5 respectively in the steps E6, E8, E10, E12. The transmission and the reception of the messages Mr are preferably performed quasi-simultaneously to ensure the coordination of the braking of the different vehicles in accordance with the messages Mr. In the steps E13, E14, E15, E16, the respective vehicles V2, V3, V4, V5 actuate the braking. According to an example in which a braking intensity is included in the messages Mr, the vehicles adjust their deceleration based on the intensity value received. According to one alternative, the vehicles V2, V3, V4, V5 can transmit, in respective steps E17, E19, E21, E23, confirmation messages Mc to the entity Op1 in order for the latter to have confirmation of the braking of all the vehicles affected by the braking of the vehicle V1. On receipt of these messages, in steps E18, E20, E22, E24, the entity Op1 knows that the setpoints of the messages Mr have been taken into account by the different vehicles concerned and that it is not necessary to return new messages. According to an alternative, the messages Mc can comprise a braking intensity, corresponding or not to the braking intensity indicated in the messages Mr in such a way that the entity Op1 can, if necessary, retransmit a message Mr with new intensities to increase the intensity if necessary or reduce it if possible.

According to an alternative, the vehicle V1 can also transmit the message Mf to the vehicle V2 which follows it, even to a vehicle which precedes it in the case where it accelerates. In the rest of the example, it is considered that the message is transmitted to the vehicle which follows it. The vehicle V2, directly following the vehicle V1 and having to brake suddenly, acquires the information of the message Mr from the entity Op1 too late and is likely to begin its braking too late. The vehicle V1 can advantageously transmit the message Mf to the vehicle V2 at the moment when it sends it to the entity Op1. The transmission of the message Mf from the vehicle V1 to the vehicle V2 can be performed by using the transmission techniques proposed in the ITS context, for example by using wireless infrastructures of Wi-Fi type. According to this alternative, the different vehicles of the set have the braking information from the vehicle V1 available fast enough while maintaining the coordination of the braking of the vehicles of the set.

According to another example, the message Mf transmitted by the vehicle V1 is transmitted by a telecommunications equipment, such as a smartphone. In fact, smartphones are increasingly often equipped with "accelerometer" type functions. They can be used to acquire information relative to the braking or the acceleration of a vehicle and to transmit this information to the entity Op1.

Reference is now made to FIG. 4 which presents an overview of the adjustment method according to a second embodiment of the invention. In this embodiment, three vehicles V1, V2 and V3 form a convoy. This convoy is managed by an entity Op1. An entity Op2 manages at least one other convoy of vehicles. In this embodiment, an entity F1 which is, for example, a weather services platform, and an entity F2 which is, for example, a traffic light. In a step E1, the entity F1 transmits a message Mi1 indicating weather conditions making traffic movement difficult in a given geographic zone, for example because of snowfalls. On receipt of the message Mi1 in a step E2, the entity Op1 identifies the convoys and the vehicles affected by the message Mi1 in a step E3. In a step E4, the entity Op1 determines the action to be communicated to the vehicles of the convoys concerned. In the step E5, the entity Op1 transmits a multicast message Mr1 to the vehicles V1, V2, V3. The multicast address used corresponds to a multicast address allocated to the convoy, all the vehicles of the convoy being impacted by the message Mi1 received. The entity Op1 indicates, in the message Mr to each vehicle V1, V2, V3, that it should slow down by 20 km/h for example to adjust to the conditions. This message Mr1 is received by the vehicles V1, V2, V3 in steps E6, E7, E8 quasi-simultaneously. The vehicles V1, V2, V3 adjust their speed in accordance with the message Mr received in steps E9, E10, E11. This adjustment is done quasi-simultaneously by virtue of the message Mr received in a coordinated manner. Thus, the distances between the vehicles of the convoy remain almost identical. In a step E12, the entity Op1 also informs, via a message Mn transmitted to the entity Op2 responsible for the management of other convoys, of the recommendation transmitted to the vehicles V1, V2, V3. The choice of the management entities to be informed is for example made based on the geographic zone of the convoys, in the case where the management entities exchange location information concerning the convoys that they manage. On receipt of the message Mn, the entity Op2 informs the other convoys of the slowing down of the convoy formed by the vehicles V1, V2, V3 to maintain a sufficient safety distance between the different convoys.

In the step E14, the traffic light F2 transmits a message Mi2 to the entity Op1 indicating to it that the vehicle V1 is stopped at the light. On receipt of the message Mi2 in the step E15, the entity Op1 identifies, in the step E16, that the vehicles V2 and V3 preceding the vehicle V1 have passed the traffic light and therefore that the convoy is separated, the vehicles V2 and V3 being separated from the vehicle V1 by a distance which is too great for a convoy. The entity Op1 determines an action in the step E17. It can choose to associate the vehicle V1 with another convoy or else have it accelerate to rejoin the convoy of the vehicles V2 and V3. It determines, in the step E17, the action to have the vehicles V2 and V3 slow down so that the vehicle V1 can rejoin the two vehicles V2 and V3 to reform the convoy.

According to an alternative, the message Mi2 can originate from a vehicle belonging to another set of vehicles. To ensure the coordination of the different sets of vehicles, the entity Op1 can receive information from vehicles of different sets to allow a coordination between sets. Vehicles of each set, for example the first and the last, can transmit information, such as their speed and their position, in order for the entity Op1 to be able to decide to have the vehicles V1, V2, V3 of the set accelerate or slow down.

In the step E18 and in the step E20, the entity Op1 transmits a slowdown message Mr2 to the vehicle V2 and to the vehicle V3, with a certain deceleration intensity in m/s². These messages are transmitted in unicast mode because they are transmitted to a few vehicles of the convoy but not to all. This message Mr2 is received respectively by the vehicle V2 and the vehicle V3 in the steps E19 and E21. The entity Op1 also transmits, in the step E22, an acceleration message Mr3, with an acceleration intensity, to the vehicle V1. On receipt of the message Mr3, the vehicle V1 accelerates, as soon as it is possible for it to cross the traffic light. In the step E26, the vehicle V1 accelerates in accordance with the message Mr3 received while the vehicles V2 and V3 slow down in accordance with the message Mr2 that they have received. The vehicles V1, V2, V3 then transmit, in respective steps E27, E29, E31, a message Mc to the entity Op1 to indicate to it, for example, their respective speeds. The entity Op1, on receipt of these messages Mc in steps E28, E30, E32, can estimate the moment when the convoy will be on the point of reforming and it will have to transmit new speed setpoints to the different vehicles for the convoy to once again move in a coordinated manner.

In relation to FIG. 5, an example of structure of a device for adjusting speed according to one aspect of the invention, is presented.

The adjustment device 60 implements the adjustment method, different embodiments of which have just been described.

Such a device 60 can be implemented in an access entity of a telecommunications infrastructure or in a core network entity or even in a management platform of the operator ensuring the management of the infrastructure.

For example, the device 60 comprises a processing unit 630, equipped for example with a microprocessor µP, and driven by a computer program 610, stored in a memory 620 and implementing the adjustment method according to the invention. On initialization, the code instructions of the computer program 610 are for example loaded into a RAM memory, before being executed by the processor of the processing unit 630.

Such a device 60 comprises:
- an acquisition module 64, capable of acquiring event information (Mf, Mi1, Mi2) relating to an event occurring on the itinerary,
- an identification module 61, capable of identifying at least one target vehicle (V1, V2, V3, V4, V5) based on the acquired event information (Mf, Mi1, Mi2),
- a determination module 62, capable of determining a control instruction for the at least one target vehicle (V1, V2, V3, V4, V5) based on the acquired event information (Mf, Mi1, Mi2),
- a transmitter 63, capable of transmitting the control instruction (Mr, Mr1, Mr2) to the at least one target vehicle (V1, V2, V3, V4, V5).

The method for adjusting speed has been described in examples in which the vehicles of a convoy must accelerate or brake to allow the convoy to remain in place, that is to say for the distances between the vehicles forming the convoy to remain constant, so as to avoid accidents and breaks of convoy, occurring when a vehicle is too distant from the vehicle preceding it and/or following it. The method can also advantageously be implemented to inform the vehicles of a set, or convoy, of information on the itinerary so as, for example, to have them change itinerary dynamically based on constraints on the initial itinerary. The method can also be used to transmit messages, for example advertising messages, to the passengers of the autonomous vehicles. Thus, based on the geographic location of the convoy, and using information received then retransmitted by the management entity to the vehicles in the convoy, the adjustment method can be enriched with miscellaneous information, specific to traffic regulation, or more broadly, for enriched services offered to the passengers of the convoys. The method can also prove useful for the movement of trains and if necessary control of the different trains with respect to one another, thus making it possible to increase the number of trains traveling safely on the railway lines.

The invention claimed is:

1. An adjustment method comprising:
   adjusting a speed of at least one vehicle belonging to a set of at least two autonomous vehicles moving on an itinerary in a coordinated manner, comprising the following acts implemented in an operator's management entity of a telecommunications infrastructure capable of transmitting a message to the at least one vehicle, the operator's management entity being distinct from the set of the at least two autonomous vehicles:
   acquiring event information relating to an event occurring on said itinerary, said event information comprising an identifier of a vehicle of the set sending the event information, attesting to an identity of the vehicle of the set sending the event information,
   identifying at least one target vehicle of the set, having an identifier distinct from the identifier of the vehicle of the set having sent the event information, based on the identifier of the vehicle of the set having sent the acquired event information and on a position of the at least one target vehicle of the set with regard to the vehicle of the set having sent the acquired event information,
   determining, by the operator's management entity, a control instruction based on the acquired event information for the at least one target vehicle of the set identified based on the identifier of the vehicle of the set sending the acquired information, and
   transmitting said control instruction to the at least one target vehicle by using a network of the operator.

2. The adjustment method as claimed in claim 1, in which the event information acquired relates to braking of said vehicle of the set having sent the event information.

3. The adjustment method as claimed in claim 1, in which the event information acquired by the management entity is also received by a vehicle of the set which directly follows the vehicle of the set having sent the event information.

4. The adjustment method as claimed in claim 1, comprising acquiring further event information from a device deployed on the itinerary.

5. The adjustment method as claimed in claim 1, in which the control instruction is a braking setpoint of the at least one target vehicle.

6. The adjustment method as claimed in claim 5, in which the control instruction also comprises a braking intensity datum.

7. The adjustment method as claimed in claim 1, also comprising transmitting a notification message comprising the control instruction to a second management entity of a telecommunications infrastructure.

8. The adjustment method as claimed in claim 1, also comprising receiving, from the at least one target vehicle, an acknowledgement message comprising a parameter relating to an updated speed of the at least one target vehicle.

9. The adjustment method as claimed in claim 1, in which the control instruction is transmitted to the at least one target vehicle by using a multicast-type transmission mode.

10. The adjustment method as claimed in claim 1, in which the determination of the control instruction relates to a datum acquired from a vehicle of another set.

11. A device implemented in an operator's management entity of a telecommunications infrastructure that is capable of transmitting a message to at least one vehicle, the device comprising:
    a processor; and
    a non-transitory computer-readable medium comprising instructions stored thereon, which when executed by the processor configure the device to perform a method comprising:
    adjusting a speed of the at least one vehicle, which belongs to a set of at least two autonomous vehicles moving on an itinerary in a coordinated manner, wherein the device is distinct from the set of the at least two autonomous vehicles, and wherein the adjusting comprises:
    acquiring event information relating to an event occurring on said itinerary, said event information comprising an identifier of a vehicle of the set sending the event information, attesting to an identity of the vehicle of the set sending the event information, identifying at least one target vehicle of the set, having an identifier distinct from the identifier of the vehicle of the set having sent the event information, based on the identifier of the vehicle of the sent having sent the acquired event information and on a position of the at least one target vehicle of the set with regard to the vehicle of the set having sent the acquired event information, determining, by the device of the operator's management entity, a control instruction based on the acquired event information for the at least one target vehicle of the set identified based on the identifier of the vehicle of the set sending the acquired information, and transmitting said control instruction to the at least one target vehicle by using a network of the operator.

12. A system comprising:

an adjustment device implemented in an operator's management entity of a telecommunications infrastructure and comprising:

a processor; and a non-transitory computer-readable medium comprising instructions stored thereon, which when executed by the processor configure the device to perform a method comprising:

adjusting a speed of the at least one vehicle, which belongs to a set of at least two autonomous vehicles moving on an itinerary in a coordinated manner, wherein the adjustment device is distinct from the set of the at least two autonomous vehicles, and wherein the adjusting comprises:

acquiring event information relating to an event occurring on said itinerary, said event information comprising an identifier of a vehicle of the set sending the event information, attesting to an identity of the vehicle of the set sending the event information, identifying at least one target vehicle of the set, having an identifier distinct from an identifier of the vehicle of the set having sent the event information, based on the identifier of the vehicle of the set having sent the acquired event information and on a position of the at least one target vehicle of the set with regard to the vehicle of the set having sent the acquired event information, determining a control instruction based on the acquired event information for the at least one target vehicle of the set identified based on the identifier of the vehicle of the set sending the acquired information, and transmitting said control instruction to the at least one target vehicle; and the at least one vehicle of the set, the at least one vehicle comprising a receiver to receive the control instruction by using a network of the operator.

13. A non-transitory computer-readable storage medium that can be read by an operator's adjustment device, on which is stored instructions which when executed by a processor of the adjustment device configure the adjustment device to:

adjust a speed of at least one vehicle belonging to a set of at least two autonomous vehicles moving on an itinerary in a coordinated manner, comprising the following acts implemented by the adjustment device in a telecommunications infrastructure capable of transmitting a message to the at least one vehicle, the adjustment device being distinct from the set of the at least two autonomous vehicles:

acquiring event information relating to an event occurring on said itinerary, said event information comprising an identifier of a vehicle of the set sending the event information, attesting to an identity of the vehicle of the set sending the event information, identifying at least one target vehicle of the set, having an identifier distinct from the identifier of the vehicle of the set having sent the event information, based on the identifier of the vehicle of the set having sent the acquired event information and on a position of the at least one target vehicle of the set with regard to the vehicle of the set having sent the acquired event information, determining, by the adjustment device, a control instruction based on the acquired event information for the at least one target vehicle of the set identified based on the identifier of the vehicle of the set sending the acquired information, and transmitting said control instruction to the at least one target vehicle by using a network of the operator.

14. The adjustment method of claim 1, wherein determining the control instruction based on the acquired event information for the at least one target vehicle of the set comprises determining the control instruction for adjusting the speed of the at least one target vehicle based on the acquired event information.

15. The adjustment method of claim 1, wherein the operator's management entity identifies at least two target vehicles of the set based on the identifier of the vehicle of the set having sent the acquired event information and transmits the control instruction to the at least two target vehicles in unicast mode or in multicast mode.

16. The adjustment method of claim 1, wherein the operator's management entity transmits the control instruction to the at least one target vehicle of the set but not to at least one other vehicle of the set.

* * * * *